May 22, 1962 Y. FOULON 3,035,410
MONOBLOC ASSEMBLY FOR THE VARIOUS PARTS
OF A RAM-JET COMBUSTION DEVICE
Filed July 13, 1959 9 Sheets-Sheet 1

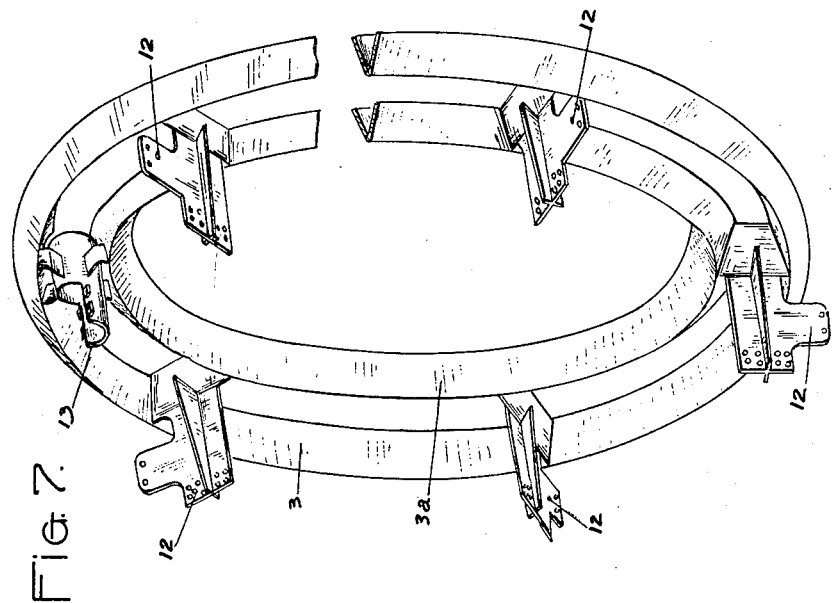
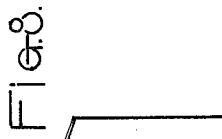
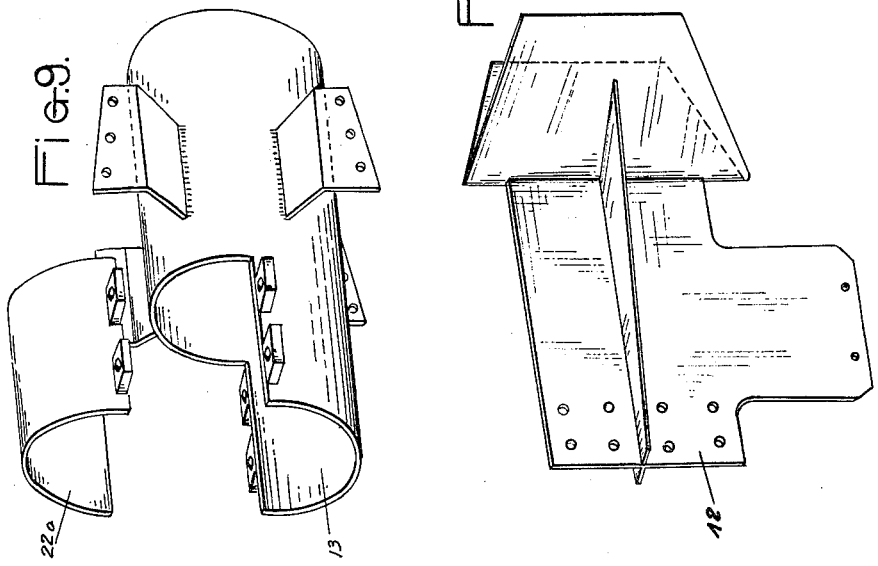

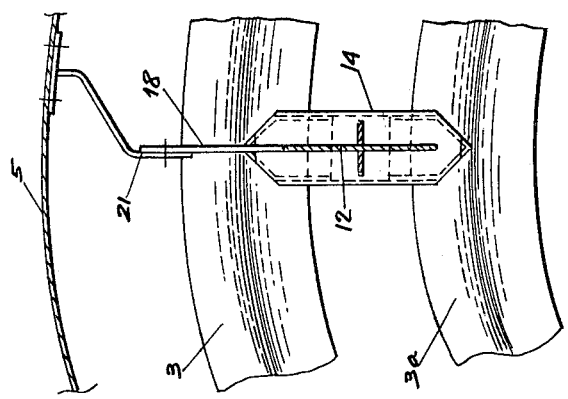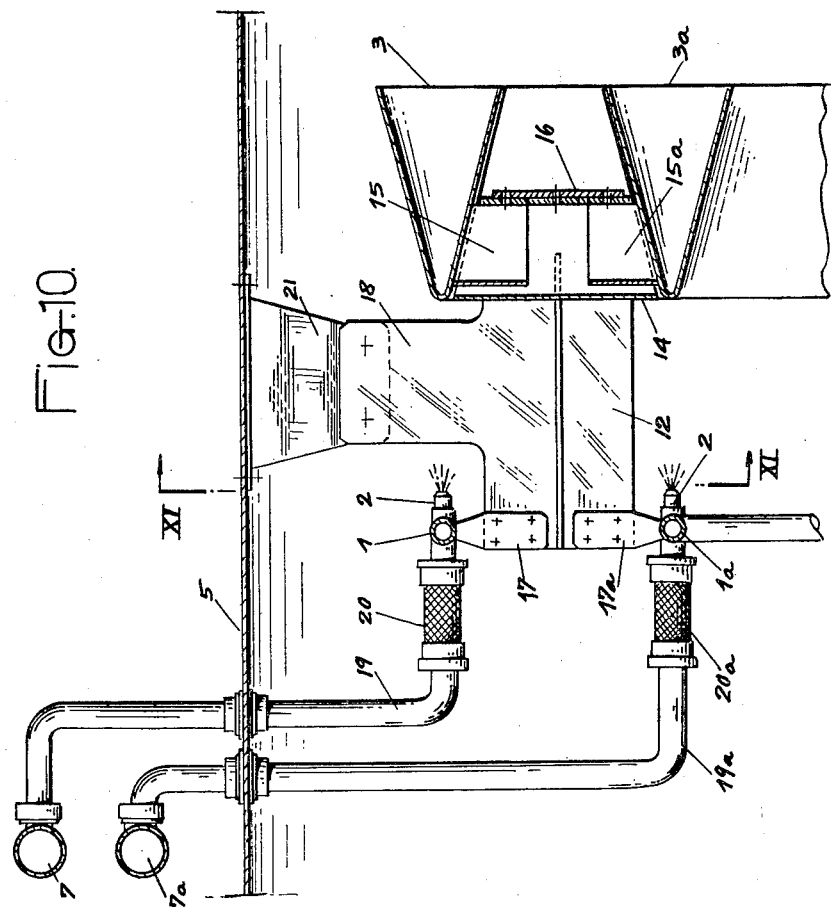

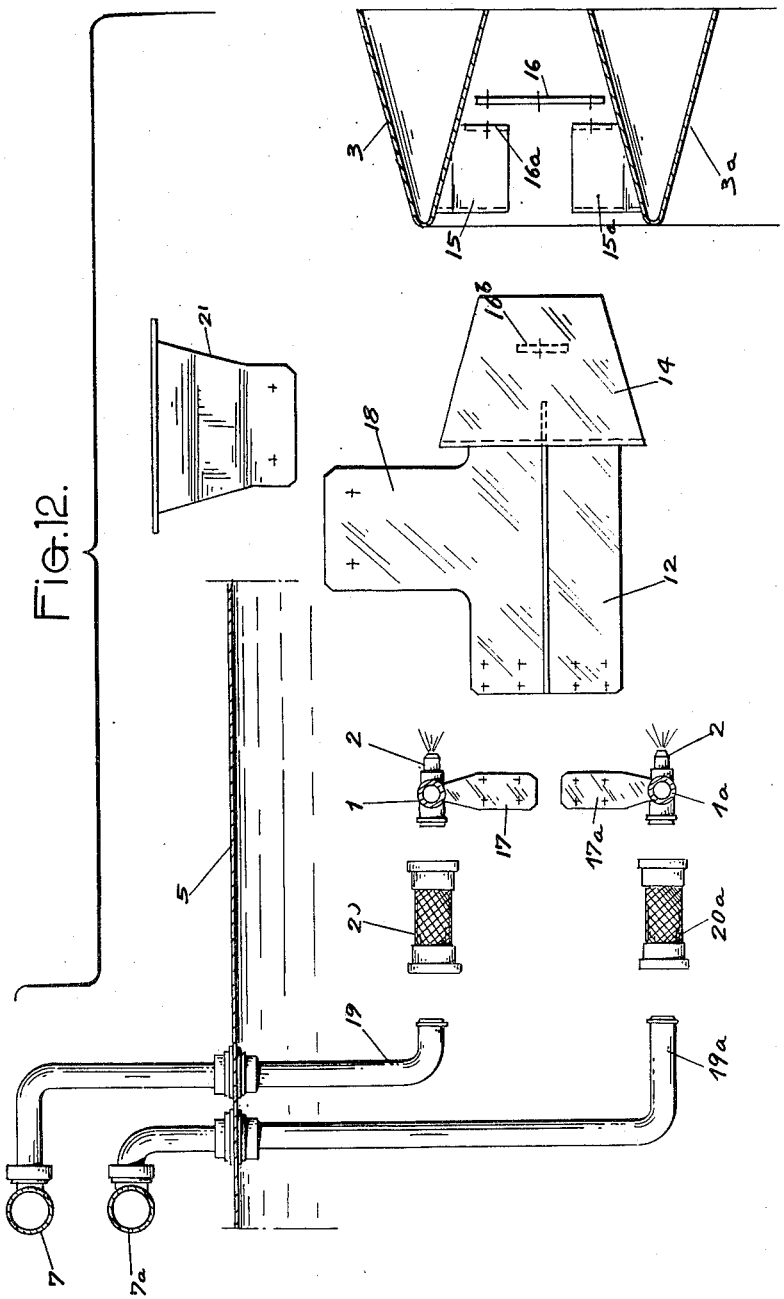

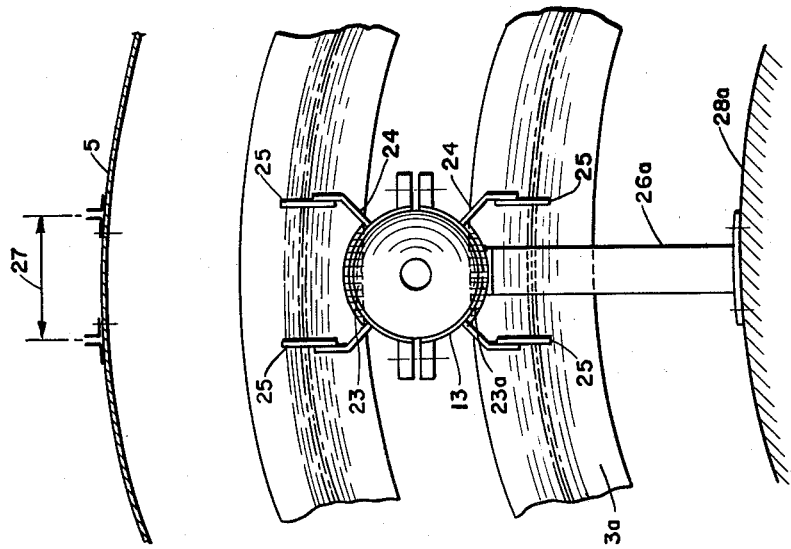
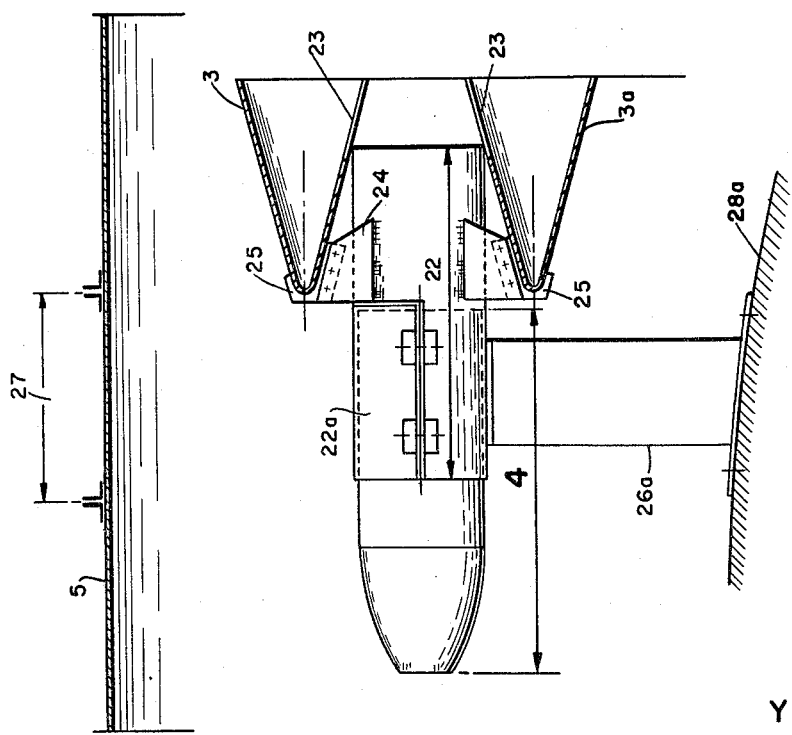

United States Patent Office 3,035,410
Patented May 22, 1962

3,035,410
MONOBLOC ASSEMBLY FOR THE VARIOUS PARTS OF A RAM-JET COMBUSTION DEVICE
Yvon Foulon, Versailles, France, assignor to Nord-Aviation, Societe Nationale de Constructions Aeronautiques, Paris, France, a joint-stock company of France
Filed July 13, 1959, Ser. No. 826,861
Claims priority, application France Apr. 29, 1959
8 Claims. (Cl. 60—35.6)

This invention relates to a device for assembling into a single unit the various parts constituting the combustion system in a ram-jet, or similar jet engine, while allowing said parts to be secured to said ram-jet, or similar jet engine.

The object of the present invention is to provide a monobloc combustion device assembling together and securing to the ram-jet the injection system, flame holders and ignition system in a manner eliminating the drawbacks of existing structures.

It essentially consists of a number of identical members interposed between the ignition grids and the flame holders and furthermore secured on fixed mountings of the ram-jet, and an ignition system support secured between the flame holders, the connections of the supporting members and the ignition device support with the parts of the combustion system and the jet mountings permitting the free expansion of the various components thus assembled together.

In a preferred embodiment applied to a ram-jet equipped with two concentric ignition feed-racks, two corresponding flame holder rings and an ignition device of the pilot chamber type, a supporting member is constituted by a first flat metal sheet stiffened by a second flat metal sheet, said member thereby having an X-shaped cross-section, one of the edges of the first metal sheet is engaged between two series of two gussets each integral with one of the two injection feed-racks, another edge of the first metal sheet is secured against a stationary mounting integrally fixed with a fixed part of the ram-jet, the rear edge of the first mounting is extended rearwardly by a V-shaped flaring intended to fit on two aligned mountings of complementary shape in their extension with one another respectively integral with the front portion of one of the two flame holder rings, the said flaring and the two said mountings able to be blocked together by appropriate means.

The ignition pilot chamber support is constituted by a supporting tube provided with four bent gussets diagonally disposed and secured to four corresponding mountings, two of which are integral with the front portion of one of the flame holder rings, while the other two are integral with the front portion of the other flame holder ring, said supporting tube also having a notch removed from its front end to allow the pilot chamber to be secured by means of a clamping strap.

Other features and advantages will become clear from the following description of a preferred embodiment of the invention with reference to the appended diagrammatic drawings, in which:

FIG. 7 is a perspective view showing the supporting members in accordance with the invention mounted between two flame holder rings.

FIG. 8 is a perspective view of a supporting member.

FIG. 9 is a perspective view of the pilot chamber support.

FIG. 10 is a longitudinal section through the combustion device according to the invention, showing a supporting member and all the parts with which it is connected.

FIG. 11 is a cross-section along line XI—XI of FIG. 10.

FIG. 12 is an exploded view of the elements shown connected in FIG. 10.

FIG. 13A is a view similar to that of FIG. 13, but showing a modification thereof.

FIG. 14A is a cross-sectional view of FIG. 13A.

Figure 1:
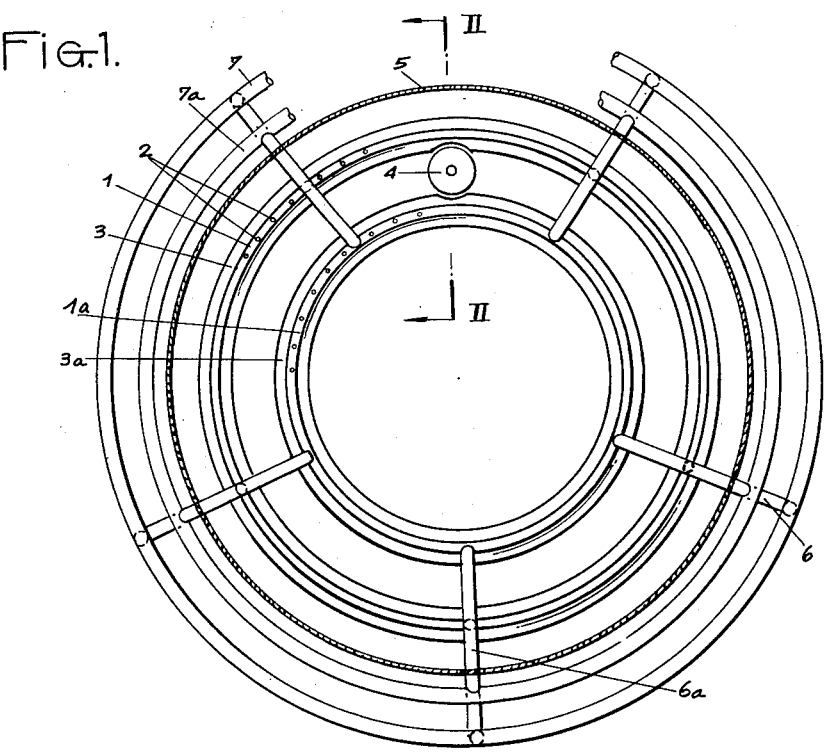
FIG. 1 is a front view of a known assembly comprising the injection system, the flame holders and the pilot chamber system disposed in a ram-jet which are to be assembled together into a single unit according to the present invention.
Figure 2:
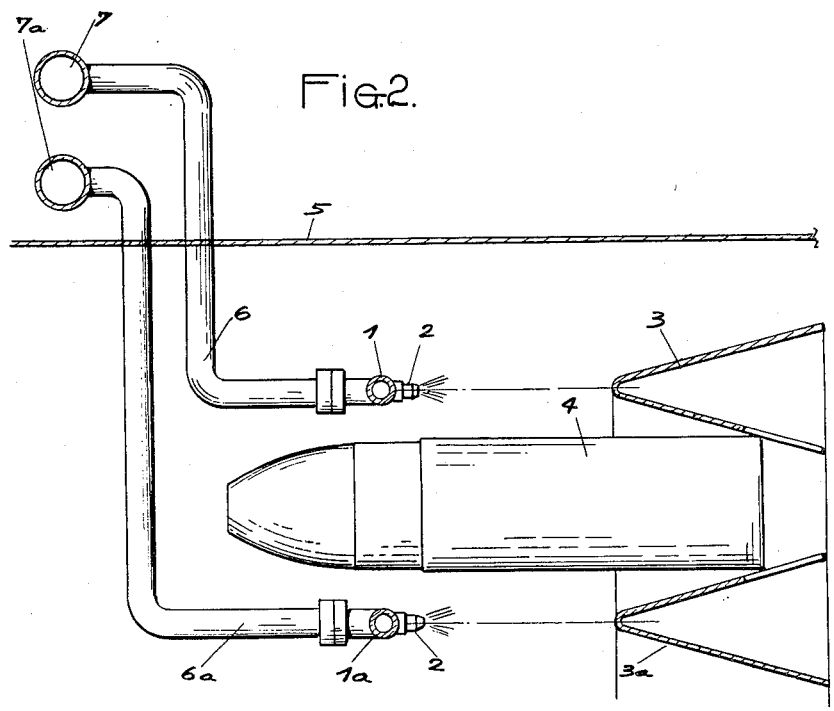
FIG. 2 is a section along line II—II of FIG. 1.

Referring first to the known form shown in FIGURES 1–6 as a preface to and understanding of the invention:

A combustion system of known type comprises (cf. FIGS. 1 and 2):

An injection system made up of two circular feed-racks 1 and 1a, called injection grids, coaxially disposed and equipped with injection apertures 2;

A flame holder made up of two rings 3 and 3a, of triangular section and located downstream of the injection apertures;

An ignition system made up of a small separate combustion chamber 4, or pilot chamber, located in the upper portion between the rings 3 and 3a, and opening upstream of these latter.

The assembly so constituted which assumes the three following functions:
Injection
Ignition
Flame holding is mounted within a combustion chamber, the wall of which is indicated by the reference numeral 5.

In order to meet certain operating conditions, each injection grid is separately fed with fuel. Five series of tubes 6 and 6a are provided to connect the said grids with two separate annular mains 7 and 7a, located outside the combustion chamber.

Figure 3:
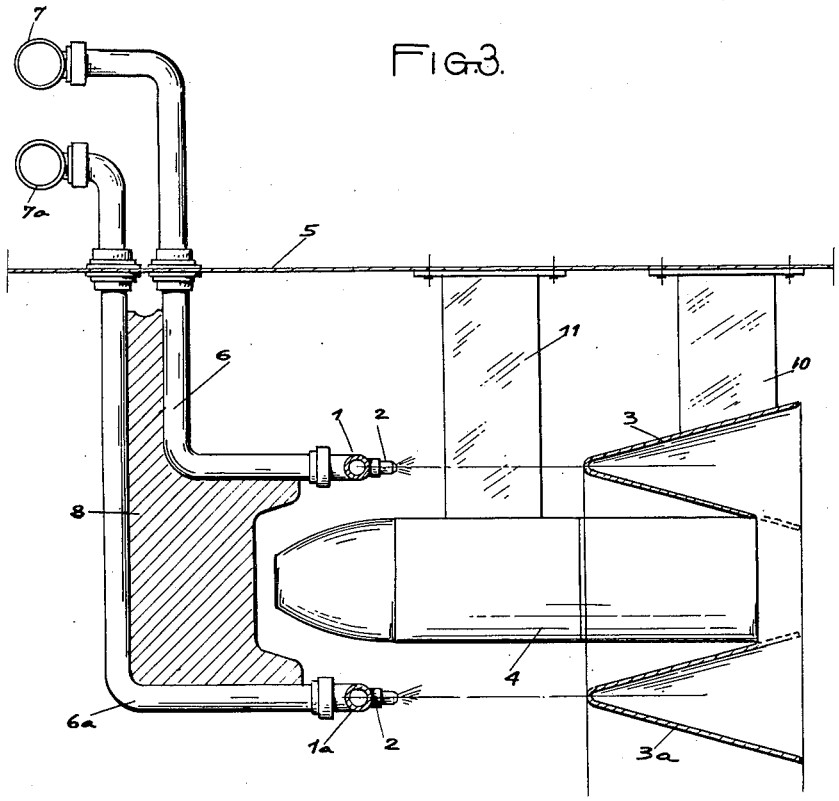
FIG. 3 shows one of the known methods of assembling and securing said parts.
Figures 4, 5, 6:
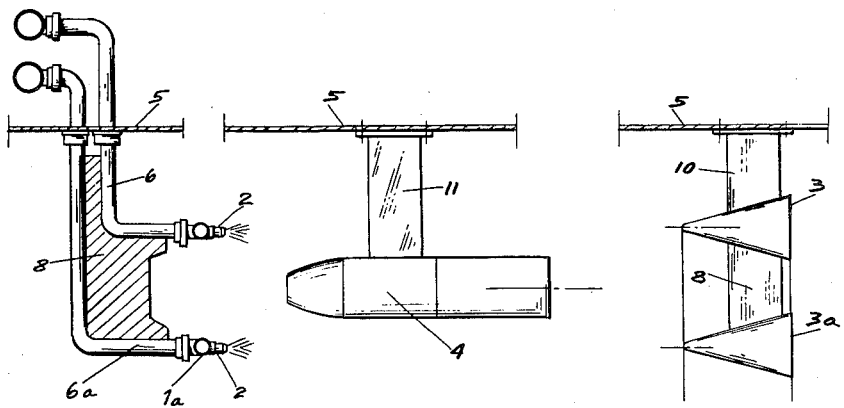
FIG. 4 shows how the known circular ignition feed-racks are secured together and to the inner wall of the combustion chamber.
FIG. 5 shows how the known flame holder rings are secured together and to the combustion chamber wall.
FIG. 6 shows how the known ignition system is fixed on the combustion chamber wall.

Heretofore, as shown in FIG. 3, the three elements corresponding to the three functions: injection, ignition and flame holding were separately mounted within the combustion chamber:

Injection grids 1 and 1a were secured on the wall 5 of the chamber by means of the feeding tubes interconnected in pairs by a gusset 8 acting as a grid support (cf. FIG. 4).

The flame holders 3 and 3a interconnected by V-shaped linking members 9, were secured to the wall 5 of the chamber by means of a series of mountings 10 (cf. FIG. 5).

The ignition pilot chamber 4 was secured to the wall 5 of the chamber through strut 11 (cf. FIG. 6).

This arrangement has some major drawbacks in that following each job by a mechanic, it was necessary to carry out certain relatively intricate readjustments relating in particular to:

The injection space and alignment (between the injection apertures 2 and the flame holders 3 and 3a)
Alignment of the pilot chamber 4 (with respect to the flame holders 3 and 3a), etc.

Moreover, the use of the feeding tubes 6 and 6a as grid supports risks causing important fuel leakages upstream of the grids by rupturing the said tubes, which incidents always prejudice good working and safety.

On the other hand the expansion effects on the flame holder rings 3 and 3a interfere with the behaviour of the V-shaped linking members 8 and the securing mountings 10.

Coming now to the present invention it is perhaps best understood as a whole from a consideration of FIGURES 10 to 14. More in detail and first in this connection with reference to FIG. 7 the device adapted to assemble the combustion system in one unit is built up from:

(1) A series of five supporting members 12 (cf. FIG. 8) which, while permitting free expansion, allows assembling of the injection grids 1 and 1a with the flame holder rings 3 and 3a, and ensures the suspension of the whole assembly inside the combustion chamber.

(2) An ignition system support (cf. FIG. 9) constituting a separate assembly 13 set up on the flame holders 3 and 3a.

The design of the supporting members 12 is clearly shown in FIGS. 10 and 11.

They have an X-shaped cross-section and carry on their rear end V-shaped linking members 14, the functions of which are:

To support the flame holder rings 3 and 3a by means of the triangular mountings 15 and 15a which are integral with the said rings and interconnected together by means of the small plate 16 secured by screws on suitable lugs 16a, 16b, shown in dotted lines;
To act in the same manner as the conventional V-shaped linking members 8 (cf. FIG. 5) which are indispensable for the correct operation of the flame holders.

The injection grids 1 and 1a are secured in the front portion of the supporting members 12 through the gussets 17 and 17a integral with the latter.

One of the metal sheets constituting the supporting members 12 extends outwardly in the shape of a lug 18 to ensure the suspension of the assembly so constituted inside the combustion chamber.

The grids are connected to the fuel feed tubes 19 and 19a which are kept independent by means of unions 20 and 20a acting as sliding joints to accommodate misalignment of the tubes.

Referring to FIGS. 10 and 11, it is clear that the assembly thus obtained is more rational since It avoids any risk of rupturing the feed tubes 19 and 19a;
It allows for the presetting of all injection adjustments: space and alignment of the injection apertures 2 with respect to the flame holder rings 3 and 3a;
It allows for the effects of expansion resulting from the operation of the flame holders.

Incidentally, it is to be noted that the grids and the front portions of the supports 12 are comparatively cold members while the V-shaped linking members 14 and the front portion of the rings 3 and 3a are located in zones cooled down by the circulation of the sprayed fuel. The mountings 15 and 15a provided to secure the rings have been offset into these cooled areas, to remove them thereby from the rear portions of the rings within which the combustion takes place. The expansion affecting these rear portions thus insulated has no important influence on the securing mountings 15 and 15a.

If, however, an expansion of the assembly takes place during protracted working, it is absorbed by the securing mountings 21 set on the lugs 18, the bent shape of which renders the suspension of the assembly more flexible.

Figure 14:
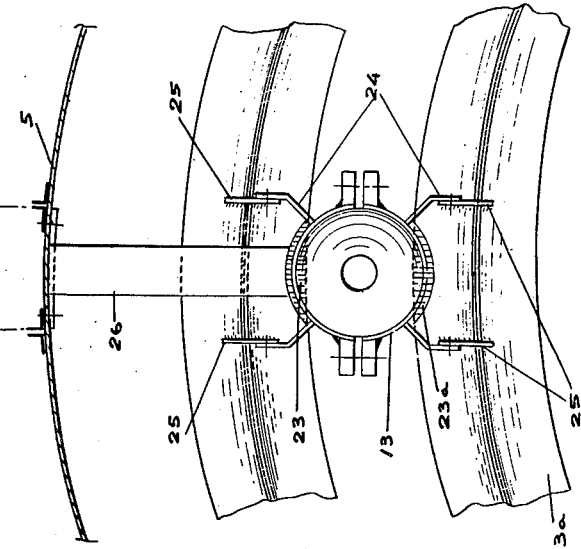
FIG. 14 is a cross-section of the pilot chamber shown in FIG. 13.
Figure 13:
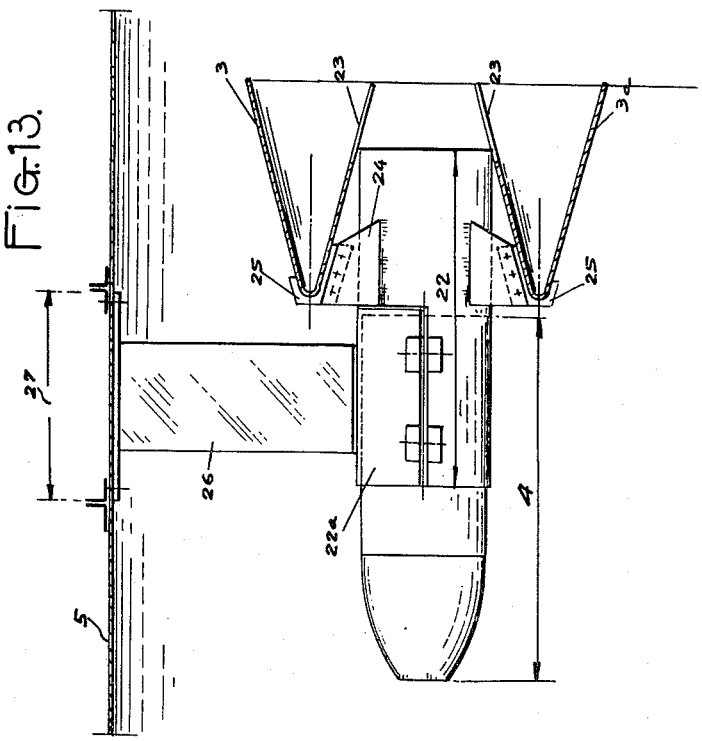
FIG. 13 is a longitudinal section showing the pilot chamber mounted in place on its support, as well as its connection with the outside of the combustion chamber.

Referring now to FIGS. 13 and 14 a separate assembly 13 is secured by means of bolts to the flame holders 3 and 3a. It is constituted by a supporting tube 22 comprising at its front end a cutout portion to take a clamping strap 22a (cf. FIG. 9) for securing the pilot chamber 4. The rear portion of the tube 22 opens out onto rings 3 and 3a which are provided with notches 23 and 23a to lead the pilot flame into the rear portion of the rings.

Four gussets 24 diagonally disposed on the tube 22 secure the latter on the rings 3 and 3a by means of mountings 25 integral with the latter. The arrangement and the bent form of the said gussets permit the free expansion of the supporting tube 22 within which burns the pilot flame.

As for the triangular mountings 15 and 15a (cf. FIGS. 10 and 12), the mountings 25 have been offset onto the front portion of the rings 3 and 3a, i.e., into cooled zones. Strut 26 is independent of the support 13 and the clamping strap 22a. It is integral with an inspection trap 27 provided in wall 5 of the combustion chamber. Its function is to fair the equipment coming into the pilot chamber (ignition cables, fuel ducts, and so on).

The following modifications may be made to the embodiment just described:

The number of supporting members 12 may be reduced or increased.

Figure 15:
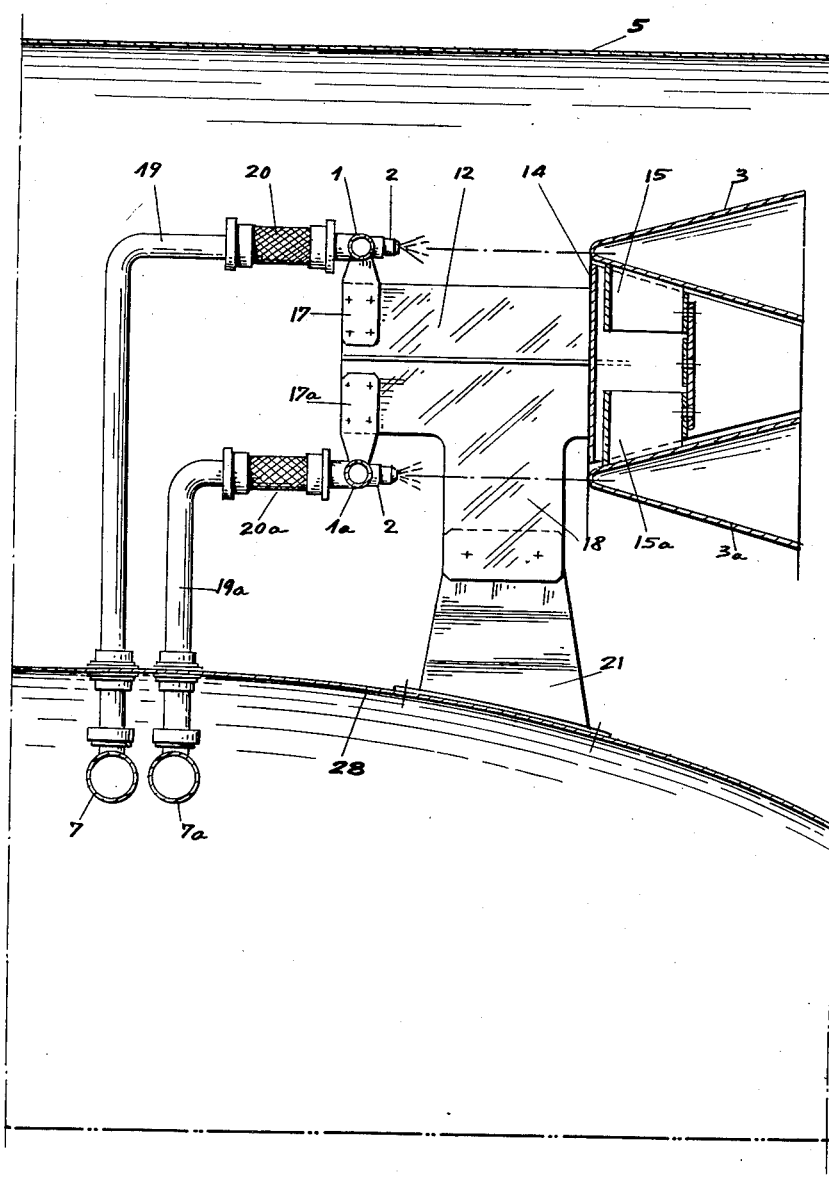
FIG. 15 shows the combustion device according to the invention secured on the central body of a ram-jet, or a combined turbo-jet-ram-jet engine.

To meet equipment requirements the lugs 18 integral with these supports 12 may extend inwardly instead of outwardly to ensure securing of the assembly on a central part 28 of the propelling engine more rigid than the wall 5 of the combustion chamber; this modification may be used particularly in a ram-jet including a central body or a combined turbo-jet-ram-jet engine (cf. FIG. 15).

Also as shown in FIGS. 13A and 14A, struts 26a are secured to and extend radially inwardly from the clamping straps 22a and have their radially inward end portions secured to a central part 28ᵃ of a propelling engine.

The invention is also adapted to be used for combustion devices comprising either one single injection grid and one single flame holder, or several grids and several flame holders, offset or not.

The circular grid system described above may be replaced by any other injection feed-rack system capable of being assembled with the flame holders.

The same is true for the latter.

As regards the ignition system, the above-described support has been conceived for an ignition device including a pilot chamber. It may be adapted to other systems (such as powder igniters) constituting a separate assembly secured on the flame holders and it may be either:

Multiplied, in the case of a large size combustion device;
Or omitted, as in the case of post-combustion on a turbojet where a different ignition method is used.

It is to be understood that the present invention has been described only by way of explanation without intent of limitation, and that various modifications to details can be carried out without exceeding the scope.

I claim:

1. In a ram-jet or similar jet engine, a device for assembling the various parts of the combustion system into a monobloc unit and for securing the same in the said ram-jet; said combustion system consisting of a fuel injection system comprising at least two concentric injection grids, each being fed with fuel independently, a flame holder system, and an ignition system, a support for said ignition system, said device comprising a plurality of identical supporting members assembling together said fuel injection system and flame holder system and securing the unit thus obtained on to the ramjet, a support securing the ignition system on to the flame holder system, and said supporting members being generally radial and having portions deflected out of the respective generally radial planes thereof to permit free expansion of the various assembled elements under the action of heat.

2. In a ram-jet or similar jet engine according to claim 1, the fuel injection system comprising two concentric injection grids, the flame holder system comprising two flame holder rings, the ignition system being of the pilot chamber type, each said supporting member consisting of a cross-shaped metal plate body, a V-shaped linking member provided with a rear tab and a lug, triangular mountings on the front portion of each flame holder ring facing each other, said mountings having rear tabs, a plate secured on the V-member and the triangular mounting tabs, a group of gussets connected with each injection grid and to the supporting members in forwardly spaced relation to the flame holder rings.

3. In a ram-jet or similar jet engine according to claim 2, wherein the deflected portions of said supporting members are secured to a portion of the combustion chamber of the said ram-jet.

4. In a ram-jet or similar jet engine according to claim 1, wherein the ram-jet has a central member and the deflected portions of said supporting members are secured to a portion of said central member.

5. In a ram-jet or similar jet engine according to claim 1, the fuel injection system comprising two concentric injection grids, the flame holder system comprising flame holder rings, the ignition system being of the pilot chamber type, a support for said ignition system, means for securing the ignition system support on the two flame holder rings comprising gussets on the periphery of said ignition system support diagonally disposed, mountings on the front of one of the flame holder rings and mountings on the front of the other flame holder ring, said gussets being secured on the four mountings, and the engine wall being provided with an inspection trap in the vicinity of the ignition device.

6. In a ram-jet or similar jet engine according to claim 5, wherein the wall of the combustion chamber of the said ram-jet has an inspection trap.

7. In a ram-jet or similar jet engine according to claim 5, a central member provided with a fixed wall having an inspection trap therein.

8. In a ram-jet or similar jet engine according to claim 5, wherein fuel-feeding tubes have sliding joint connections with the injection grids capable of accommodating a misalignment between the parts connected.

References Cited in the file of this patent

UNITED STATES PATENTS

| | | |
|---|---|---|
| 2,268,464 | Seippel | Dec. 30, 1941 |
| 2,714,287 | Carr | Aug. 2, 1955 |
| 2,726,511 | Pitt | Dec. 13, 1955 |
| 2,780,916 | Collins | Feb. 12, 1957 |
| 2,793,495 | Karcher | May 28, 1957 |